United States Patent
Chin et al.

(10) Patent No.: US 9,556,334 B2
(45) Date of Patent: Jan. 31, 2017

(54) FLAME-RETARDANT THERMOPLASTIC RESIN COMPOSITION AND A MOLDED PRODUCT THEREOF

(71) Applicant: Samsung SDI Co., Ltd., Yongin-si (KR)

(72) Inventors: Kyoungsik Chin, Uiwang-si (KR); Suji Kim, Uiwang-si (KR); Seungshik Shin, Uiwang-si (KR); Pilho Kim, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/706,279

(22) Filed: May 7, 2015

(65) Prior Publication Data
US 2015/0322260 A1  Nov. 12, 2015

(30) Foreign Application Priority Data

May 7, 2014  (KR) ........................ 10-2014-0054349

(51) Int. Cl.
*C08L 69/00*  (2006.01)
(52) U.S. Cl.
CPC ..................................... *C08L 69/00* (2013.01)
(58) Field of Classification Search
CPC ....................................................... C08L 69/00
USPC ........................................................ 524/127
See application file for complete search history.

(56) References Cited

U.S. PATENT DOCUMENTS

| | | | | | |
|---|---|---|---|---|---|
| 4,388,422 | A | * | 6/1983 | Gerteisen | C08K 7/04 523/137 |
| 2004/0034132 | A1 | * | 2/2004 | Campbell | C08K 5/523 524/184 |
| 2007/0276081 | A1 | * | 11/2007 | Yuan | C08K 7/06 524/494 |
| 2008/0242789 | A1 | * | 10/2008 | Zhu | C08L 67/02 524/451 |
| 2011/0028615 | A1 | * | 2/2011 | Li | C08L 69/00 524/140 |
| 2013/0317145 | A1 | * | 11/2013 | An | C08K 3/22 524/116 |
| 2014/0093682 | A1 | * | 4/2014 | Nakamoto | C08L 55/02 428/141 |

FOREIGN PATENT DOCUMENTS

JP  2009-292953  * 12/2009

OTHER PUBLICATIONS

Machine translation of JP 2009-292953.*

* cited by examiner

*Primary Examiner* — Doris Lee
(74) *Attorney, Agent, or Firm* — Additon, Higgins & Pendleton, P.A.

(57) ABSTRACT

Provided herein is a flame-retardant thermoplastic resin composition and a molded product thereof, the composition including polycarbonate resin, rubber modified aromatic vinyl copolymer, aromatic phosphate ester compound, glass fiber, and carbon fiber, wherein the composition includes a weight ratio of the glass fiber to the carbon fiber of about 1:0.3 to about 1:2.

12 Claims, No Drawings

FLAME-RETARDANT THERMOPLASTIC RESIN COMPOSITION AND A MOLDED PRODUCT THEREOF

CROSS-REFERENCE TO RELATED APPLICATION

This application claims the benefit of priority under 35 U.S.C. §119(a) of Korean Patent Application No. 10-2014-0054349, filed on May 7, 2014, in the Korean Intellectual Property Office, the entire disclosure of which is incorporated herein by reference for all purposes.

FIELD

Various embodiments of the present invention relate to a flame-retardant thermoplastic resin composition and a molded product thereof, and more particularly to a polycarbonate flame-retardant thermoplastic resin composition and a molded product thereof.

BACKGROUND

Polycarbonate resin is a type of engineering plastic having excellent mechanical strength, thermal-resistance, and transparency, which is used in various fields including office automation devices, electric/electronic components, and construction materials. In the electric/electronic component field, the resin to be used as the exterior material of laptop computers is required to have high flame-retardancy. In addition, as televisions, monitors, and laptop computers become slimmer by using thin film transistors, the resin is required to have higher stiffness.

In general, together with thermoplastic polycarbonate resin, rubber modified styrene copolymer resin is used in electric/electronic products since it has good processability, impact strength, and appearance. Especially, for devices that radiate heat, rubber modified styrene copolymer resin is used together with flame-retardants. However, in such a case, the phenomenon of shrinking that is peculiar to plastic when being cooled may cause a product to twist or break.

Therefore, there is a need for a thermoplastic resin composition having excellent flame-retardancy but low shrinkage and undeteriorated mechanical properties.

SUMMARY

Therefore, a purpose of various embodiments of the present disclosure is to resolve the aforementioned problems of conventional technology, that is, to provide a flame-retardant thermoplastic resin composition wherein glass fiber and carbon fiber are added in an optimal ratio, thereby realizing excellent low shrinkage properties while retaining flame-retardancy and stiffness.

Another purpose of various embodiments of the present disclosure is to provide a flame-retardant thermoplastic resin composition wherein polycarbonate resin, rubber modified aromatic vinyl copolymer, aromatic phosphate ester compound, glass fiber and carbon fiber each having optimal properties are mixed in an optimal ratio, thereby realizing excellent flame-retardancy, undeteriorated stiffness, impact strength, and low shrinkage properties.

An embodiment of the present disclosure provides a flame-retardant thermoplastic resin composition including polycarbonate resin, rubber modified aromatic vinyl copolymer, aromatic phosphate ester compound, glass fiber, and carbon fiber, wherein a content (weight) ratio of the glass fiber to the carbon fiber is about 1:0.3 to about 1:2.

An average ratio of a diameter to length of the glass fiber may be about 1:75 to about 1:1600. The diameter of the glass fiber may be about 5 to about 20 μm, and the length of the glass fiber may be about 1.5 to about 8 mm. An average ratio of a diameter to length of the carbon fiber may be about 1:75 to about 1:4000. The diameter of the carbon fiber may be about 3 to about 20 μm, and the length of the carbon fiber may be about 1.5 to about 12 mm.

Furthermore, in a cross-section of the glass fiber, an average ratio of a major axis to minor axis may be about 1:1 to about 2:1.

The polycarbonate resin composition may include the rubber modified aromatic vinyl copolymer in an amount of about 5 to about 30 parts by weight, and the aromatic phosphate ester compound in an amount of about 10 to about 30 parts by weight, each based on about 100 parts by weight of the polycarbonate resin.

The polycarbonate resin composition may include the glass fiber in an amount of about 1 to about 50 parts by weight, and the carbon fiber in an amount of about 1 to about 50 parts by weight, each based on about 100 parts by weight of the polycarbonate resin.

The rubber aromatic vinyl copolymer may include about 5 to about 50 weight % of rubber.

The rubber modified aromatic vinyl copolymer may include an aromatic vinyl graft copolymer resin and optionally an aromatic vinyl copolymer resin. The rubber modified aromatic vinyl copolymer may include about 20 to 100 weight % of the aromatic vinyl graft copolymer resin and 0 to 80 weight % of the aromatic vinyl copolymer resin.

The aromatic phosphate ester compound may be represented by the following Chemical Formula 2:

[Chemical formula 2]

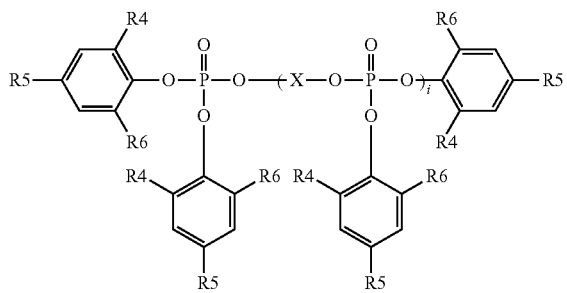

In Chemical Formula 2, R4, R5, and R6 may be the same or different and each may independently be hydrogen or C1 to C4 alkyl; each X may independently be C6 to C20 aryl or C1 to C10 alkyl-substituted C6 to C20 aryl and may be derived from dialcohol such as resorcinol, hydroquinol, and/or bisphenol-A; and i may be 0 to 4.

The flame-retardant thermoplastic resin composition may have a coefficient of linear thermal expansion (CTE) of less than about 30, a flame retardancy of V-O measured in accordance with UL-94, an Izod impact strength of about 5 to about 7 kgfcm/cm measured according to ASTM D256, and a flexural modulus of about 55,000 to about 75,000 kgf/cm² measured according to ASTM D790.

The aforementioned various embodiments of the present invention can have an advantage of realizing excellent low shrinkage properties while retaining flame-retardancy and stiffness due to the glass fiber and carbon fiber added therein in an optimal ratio.

Furthermore, there can be an advantage of realizing excellent flame-retardancy while retaining stiffness and impact strength due to the polycarbonate resin, rubber modified aromatic vinyl copolymer, phosphate ester compound, glass fiber and carbon fiber each having optimal properties mixed therein in an optimal ratio.

Furthermore, there can be an advantage of preventing halogen gas from being generated, thereby realizing a flame-retardant thermoplastic resin composition that is environmentally friendly and can have excellent mechanical properties, allowing the composition to be used as materials for electric/electronic components.

The aforementioned effects of the present invention are not limited to the aforementioned effects, and other effects not mentioned above will be clearly understood by those skilled in the art from the disclosure of the claims.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

The present disclosure relates to a flame-retardant thermoplastic resin composition and a molded product thereof.

The flame-retardant thermoplastic resin composition of the present disclosure includes polycarbonate resin, rubber modified aromatic vinyl copolymer, aromatic phosphate ester compound, glass fiber and carbon fiber. Such a configuration is aimed at realizing the flame-retardancy, stiffness, impact strength, and low shrinkage properties. Each component will be explained hereinbelow.

(A) Polycarbonate Resin

The polycarbonate resin used in the present invention may be an aromatic polycarbonate resin produced by reacting one or more diphenols expressed by Chemical Formula I shown below with phosgene, halogen formate, and/or carbonate diester.

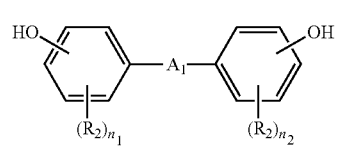

[Chemical Formula I]

As used herein, $A_1$ is a single bond; substituted or unsubstituted C1 to C5 alkylene; substituted or unsubstituted C1 to C5 alkylidene; substituted or unsubstituted C3 to C6 cycloalkylene; substituted or unsubstituted C5 to C6 cycloalkylidene; CO; S; or $SO_2$. $R_1$ and $R_2$ are the same or different and are each independently substituted or unsubstituted C1 to C30 alkyl or substituted or unsubstituted C6 to C30 aryl. n1 and n2 are the same or different and are each independently integers of 0 to 4.

The term "substituted" refers to a hydrogen atom having been substituted by one or more substituents such as a halogen radical; C1 to C30 alkyl; C1 to C30 haloalkyl; C6 to C30 aryl; C2 to C30 heteroaryl; C1 to C20 alkoxy; or a combination thereof.

Examples of the diphenol that may be used in the present invention include without limitation hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. In exemplary embodiments, 2,2-bis-(4-hydroxyphenyl)-propane, 2,2-bis-(3,5-dichloro-4-hydroxyphenyl)-propane, and/or 1,1-bis-(4-hydroxyphenyl)-cyclohexane may be used, for example, 2,2-bis-(4-hydroxyphenyl)-propane (also called bisphenol-A) may be used.

The polycarbonate resin used herein may have, without limitation, a weight-average molecular weight (Mw) of between about 10,000 and about 200,000 g/mol, for example between about 15,000 and about 80,000 g/mol.

The polycarbonate resin used herein may have a branched chain. A branched chain polycarbonate resin may be produced by adding a compound having, per total diphenol used in polymerization, between 0.05 and 2 mol % of tri or more multifunctional compound, for example, a compound of trivalent or higher phenol radicals.

The polycarbonate resin used herein may be a homopolycarbonate resin, copolycarbonate resin, or a blend thereof.

Furthermore, a portion or entirety of the polycarbonate resin may be replaced by an aromatic polyester-carbonate resin obtained by polymerization in the presence of an ester precursor, for example di- and/or multifunctional carboxylic acid.

(B) Rubber Modified Aromatic Vinyl Copolymer

The rubber modified aromatic vinyl copolymer used in the present invention may be a resin polymer wherein grafted rubber polymer exists in the form of dispersed particles in a matrix (continuous phase) including a copolymer of vinyl monomers. The rubber modified aromatic vinyl copolymer resin may be produced by adding aromatic vinyl monomers and vinyl monomers that can be copolymerized therewith in the presence of rubber phase polymer and polymerizing the same. Such rubber modified aromatic vinyl copolymer resin may be produced by known polymerization methods such as emulsion polymerization, solution polymerization, suspension polymerization, and mass polymerization.

In general, aromatic vinyl graft copolymer resin (b1) with a high rubber content and aromatic vinyl copolymer resin (b2) that does not contain rubber are produced separately and are then mixed together to form a rubber modified aromatic vinyl copolymer resin (B). However, in the case of mass polymerization, rubber modified aromatic vinyl copolymer resin (B) can be produced in one step reaction process without producing the aromatic vinyl graft copolymer resin (b1) and the aromatic vinyl copolymer resin (b2) individually.

In any of the aforementioned polymerization methods, the amount of rubber in the final rubber modified aromatic vinyl copolymer resin may be about 5 to about 50 weight %, for example about 15 to about 35 weight %, and as another example about 25 weight %, based on the total weight (100 weight %) of the final rubber modified aromatic vinyl copolymer resin. In some embodiments, the final rubber modified aromatic vinyl copolymer resin may include rubber in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 weight %. Further, according to some embodiments of the present invention, the amount of rubber can be in a range from about any of the foregoing amounts to about any other of the foregoing amounts.

Examples of the rubber modified aromatic vinyl copolymer resin that may be used in the present invention include without limitation acrylonitrile-butadiene-styrene copolymer resin (ABS), acrylonitrile-styrene-acrylic rubber copolymer resin (ASA), acrylonitrile-ethylene propylene rubber-styrene copolymer resin (AES), methyl methacrylate-butadiene-styrene copolymer resin (MBS), and the like, and combinations thereof.

The rubber modified aromatic vinyl copolymer resin may be used as a graft resin or a combination of a graft copolymer resin and a copolymer resin, wherein the graft copolymer resin and the copolymer resin may be mixed in amounts taking into consideration their compatibility. For example, the rubber modified aromatic vinyl copolymer resin (B) may include an aromatic vinyl graft copolymer resin (b1) in an amount of about 20 to 100 weight %, and an aromatic vinyl copolymer resin (b2) in an amount of 0 to about 80 weight %, based on the total weight (100 weight %) of the rubber modified aromatic vinyl copolymer resin (B).

In some embodiments, the rubber modified aromatic vinyl copolymer resin (B) may include aromatic vinyl graft copolymer resin (b1) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 weight %. Further, according to some embodiments of the present invention, the amount of aromatic vinyl graft copolymer resin (b1) can be in a range from about any of the foregoing amounts to about any other of the foregoing amounts.

In some embodiments, the rubber modified aromatic vinyl copolymer resin (B) may include aromatic vinyl copolymer resin (b2) in an amount of 0 (the aromatic vinyl copolymer resin (b2) is not present), about 0 (the aromatic vinyl copolymer resin (b2) is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 weight %. Further, according to some embodiments of the present invention, the amount of aromatic vinyl copolymer resin (b2) can be in a range from about any of the foregoing amounts to about any other of the foregoing amounts.

The polycarbonate resin composition may include the rubber modified aromatic vinyl copolymer resin (B) in an amount of about 5 to about 30 parts by weight, for example about 10 to about 25 parts by weight, and as another example about 15 to about 20 parts by weight, based on about 100 parts by weight of the polycarbonate resin. In some embodiments, the polycarbonate resin composition may include the rubber modified aromatic vinyl copolymer resin (B) in an amount of about 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the rubber modified aromatic vinyl copolymer resin (B) can be in a range from about any of the foregoing amounts to about any other of the foregoing amounts.

When the rubber modified aromatic vinyl copolymer resin (B) is present in an amount of less than about 5 parts by weight, it may have an insignificant impact reinforcement effect, and when the rubber modified aromatic vinyl copolymer resin (B) is present in an amount greater than about 30 parts by weight, flame-retardancy and shrinkage properties may deteriorate.

Hereinafter, explanation will be made about the (b1) aromatic vinyl graft copolymer resin and the (b2) aromatic vinyl copolymer resin that are components of the rubber modified aromatic vinyl copolymer resin (B) of the present invention.

(b1) Aromatic Vinyl Graft Copolymer Resin

The aromatic vinyl graft copolymer resin (b1) used in the present invention may be produced by adding, to a rubber polymer, an aromatic vinyl monomer that may be graft copolymerized and a monomer that may be copolymerized with the aromatic vinyl monomer, and then polymerizing the same.

Examples of the rubber that may be used in the present invention include without limitation diene rubbers such as butadiene, styrene-butadiene, acrylonitrile-butadiene, saturated rubbers to which hydrogen is added to the diene rubber, isoprene rubbers, acrylic rubbers such as (meth) acrylic acid alkyl ester rubbers such as butyl (meth)acrylate rubber, and ternary copolymers of ethylene/propylene/diene monomer (EPDM). In exemplary embodiments, the rubber includes butadiene rubber.

The aromatic vinyl graft copolymer resin (b1) may include the rubber (rubber phase polymer) in an amount of about 10 to about 60 weight %, based on the total weight (100 weight %) of the aromatic vinyl graft copolymer resin (b1).

Herein, considering the impact strength and appearance when producing the aromatic vinyl graft copolymer, the average size of a rubber particle may be about 0.05 to about 4 µm.

Examples of the aromatic vinyl monomer that can be graft copolymerized to the rubber include without limitation styrene, α-methylstyrene, nuclear substituted styrene, and the like, and combinations thereof. In exemplary embodiments the aromatic vinyl monomer includes styrene.

The aromatic vinyl graft copolymer resin (b1) may include the aromatic vinyl monomer in an amount of about 20 to about 80 weight %, based on the total weight (100 weight %) of the aromatic vinyl graft copolymer resin (b1).

Examples of the monomer that can be copolymerized with the aromatic vinyl monomer include without limitation acrylonitrile, methacrylonitrile, methyl methacrylate, N-substituted maleimide, maleic acid anhydride, and the like, and combinations thereof. In exemplary embodiments, the monomer that can be copolymerized with the aromatic vinyl monomer includes acrylonitrile.

The aromatic vinyl graft copolymer resin (b1) may include the monomer that can be copolymerized to the aromatic vinyl monomer in an amount of about 5 to about 45 weight %, based on the total weight (100 weight %) of the aromatic vinyl graft copolymer resin (b1).

(b2) Aromatic Vinyl Copolymer Resin

The aromatic vinyl copolymer resin may be prepared by polymerizing aromatic vinyl monomer and monomer that may be copolymerized with the aromatic vinyl monomer in amounts similar to the ratios thereof used in the polymerization of the aromatic vinyl graft copolymer resin (b1), except excluding rubber, taking into consideration compatibility.

Examples of the aromatic vinyl monomer that may be used in the aromatic vinyl copolymer resin include without limitation styrene, α-methylstyrene, nuclear substituted styrene, and the like, and combinations thereof. In exemplary embodiments, the aromatic vinyl monomer includes styrene. The aromatic vinyl copolymer resin (b2) may include the aromatic vinyl monomer in an amount of about 50 to about 95 weight %, based on the total weight (100 weight %) of the aromatic vinyl copolymer resin (b2).

Examples of the monomer that may be copolymerized with the aromatic vinyl monomer include without limitation acrylonitrile, methacrylonitrile, methyl methacrylate, N-substituted maleimide, maleic acid anhydride, and the like, and combinations thereof. In exemplary embodiments, the monomer than may be copolymerized with the aromatic vinyl monomer includes acrylonitrile.

The styrene copolymer resin (b2) may include the monomer that may be copolymerized with the aromatic vinyl monomer in an amount of about 5 to about 50 weight %, based on the total weight (100 weight %) of the aromatic vinyl copolymer resin (b2).

(c) Aromatic Phosphate Ester Compound

The aromatic phosphate ester compound used in the thermoplastic resin composition of the present invention can include a compound represented by the structure of Chemical Formula 2 below:

[Chemical Formula 2]

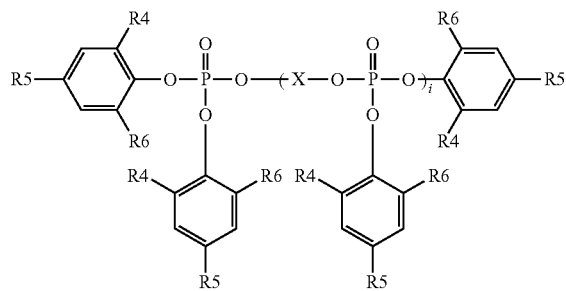

In Chemical Formula 2, R4, R5, and R6 are the same or different and are each independently hydrogen or C1 to C4 alkyl; X is C6 to C20 aryl or C1 to C10 alkyl-substituted C6 to C20 aryl, and can be derived from dialcohol such as resorcinol, hydroquinol, and bisphenol-A; and i may be 0 to 4.

Examples of compounds of Chemical Formula 2, when i is 0, include without limitation triphenylphosphate, tricresylphosphate, trixyrenylphosphate, tri(2,6-dimethylpenyl)phosphate, tri(2,4,6-trimethylpenyl)phosphate, tri(2,4-ditertiarybutylpenyl)phosphate, and/or tri-(2,6-dimethylpenyl)phosphate; and when i is 1, include without limitation resorcinol bis(diphenyl)phosphate, resorcinol bis(2,6-dimethylphenyl)phosphate, resorcinol bis(2,4-ditertiarybutylphenyl)phosphate, hydroquinol bis(2,6-dimethylphenyl)phosphate, and/or hydroquinol bis(2,4-ditertiarybutylphenyl)phosphate. These phosphate ester compounds may be used individually or as mixtures of two or more thereof.

The polycarbonate resin composition may include the aromatic phosphate ester compound in an amount of about 10 to about 30 parts by weight, for example about 15 to about 25 parts by weight, and as another example about 20 parts by weight, based on about 100 parts by weight of the polycarbonate resin. In some embodiments, the polycarbonate resin composition may include the aromatic phosphate ester compound in an amount of about 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of the aromatic phosphate ester compound can be in a range from about any of the foregoing amounts to about any other of the foregoing amounts.

When the aromatic phosphate ester compound is present in an amount less than about 10 parts by weight, it can have insignificant flame-retardancy, and when the aromatic phosphate ester compound is present in an amount greater than about 30 parts by weight, stiffness can significantly deteriorate.

(D) Glass Fiber

The glass fiber used in the present invention may be a generally used glass fiber. The glass fiber used in the present invention may have a diameter of about 5 to about 20 μm, and a length of about 1.5 to about 8 mm. For example, glass fiber having a diameter of about 8 to about 15 μm, and a length of about 2 to about 5 mm may be used. When the glass fiber has a diameter of the aforementioned range, it may exhibit excellent impact reinforcement effect in the resin composition of the present invention. When the glass fiber has a length of the aforementioned range, it may be easily put into an extruder for molding, and productivity can increase.

Furthermore, an average ratio of the diameter to length of the glass fiber may be about 1:75 to about 1:1600, for example about 1:200 to about 1:500. Within this range, it is possible to maximize the impact reinforcement effect of the resin composition while improving the productivity as well. Herein, the average ratio of the diameter to length of the glass fiber refers to an average value of the ratio of the diameter to length of each of the plurality of glass fiber.

A cross-section of the glass fiber may be selected from a circular shape, oval shape, rectangular shape, and/or dumbbell shape wherein two rectangles or two circles are connected together. For example, the cross-section of the glass fiber may be selected from a rectangular shape and/or oval shape.

The glass fiber may be surface-treated by a predetermined glass fiber treatment agent in order to prevent reaction of the polycarbonate resin and to improve the degree of impregnation, and this surface-treatment may be performed when producing fiber or in a subsequent process.

Examples of the glass fiber treatment agents that may be used in the present invention include lubricants, coupling agents, and/or surfactants and the like. The lubricant is used to form a good strand having a consistent thickness when producing the glass fiber, and the coupling agent serves to provide a good adhesion with the glass fiber. By selecting the adequate surface treatment agent of these various glass fiber treatment agents according to the type of resin and glass fiber being used, it is possible to provide good properties to the glass fiber reinforcement materials.

The polycarbonate resin composition may include the glass fiber in an amount of about 1 to about 50 parts by weight, for example about 10 to about 30 parts by weight, and as another example about 20 parts by weight. In some embodiments, the polycarbonate resin composition may include the glass fiber in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the glass fiber can be in a range from about any of the foregoing amounts to about any other of the foregoing amounts.

When the glass fiber is present in an amount within the aforementioned range, it is possible to maximize the flexural modulus of the thermoplastic resin composition of the present invention.

Furthermore, in a cross-section of the glass fiber, an average ratio of a major axis to a minor axis may be about 1:1 to about 2:1, for example about 1:1 to about 1.5:1. When a cross-section of the glass fiber is within this range, it is possible to realize the low shrinkage properties well. Herein, in a cross-section of the glass fiber, the length of the longest segment line that passes the center of the cross-section may be referred to as the major axis, and the length of the shortest segment line that passes the center of the cross-section may be referred to as the minor axis. An average ratio of the major axis to the minor axis refers to the average value of the ratio of each major axis to each minor axis of each of the plurality of glass fiber.

(E) Carbon Fiber

In the present invention, carbon fiber refers to fiber which includes at least 92 weight % carbon. The carbon fiber may be classified as polyacrylonitrile (PAN) carbon fiber, pitch carbon fiber, and/or rayon carbon fiber depending on the starting material.

The carbon fiber that may be used in the present invention may be a generally used carbon fiber. The carbon fiber may have a diameter of about 3 to about 20 μm, and a length of about 1.5 to about 12 mm, for example a diameter of about 4 to about 11 μm and a length of about 5 to about 9 mm. When the carbon fiber has a diameter and length within this range, it is possible to realize excellent stiffness and low shrinkage properties.

The polycarbonate resin composition may include the carbon fiber in an amount of about 1 to about 50 parts by weight, for example about 5 to about 40 parts by weight, and as another example about 5 to about 30 parts by weight, based on about 100 parts by weight of the polycarbonate resin. In some embodiments, the polycarbonate resin composition may include the carbon fiber in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of the carbon fiber can be in a range from about any of the foregoing amounts to about any other of the foregoing amounts.

When the carbon fiber is present in an amount less than about 1 part by weight, the effect of increasing the low shrinkage properties can be insignificant, and when the carbon fiber is present in an amount greater than about 50 parts by weight, the impact strength may deteriorate.

Furthermore, an average ratio of a diameter to length of the carbon fiber may be about 1:75 to about 1:4000, for example about 1:450 to about 1:2250. Within this range, it is possible to maximize the stiffness and low shrinkage properties.

Furthermore, in the flame-retardant thermoplastic resin composition, a weight ratio of the glass fiber to the carbon fiber may be about 1:0.3 to about 1:2, for example about 1:0.4 to about 1:1.5, and as another example about 1:1. Within this range, it is possible to realize a flame-retardant thermoplastic resin composition with excellent flame-retardancy, undeteriorated stiffness, excellent impact strength, and low shrinkage properties.

The thermoplastic resin composition with excellent flame-retardancy and low shrinkage properties of the present invention may further include one or more additives. Examples of the additives may include without limitation UV stabilizer, fluorescent whitening agent, lubricant, release agent, nucleating agent, anti-static agent, stabilizer, reinforcing agent, inorganic additive, coloring agent such as a pigment and/or dye, and the like, and combinations thereof.

The UV stabilizer serves to restrain color changes and deterioration of photoreflectance in a resin composition caused by UV emission. Examples of UV stabilizers that may be used in the present invention include without limitation benzotriazol, benzophenone, and/or triazine compounds.

The fluorescent whitening agent serves to increase the photoreflectance of the polycarbonate resin composition. Examples of fluorescent whitening agents that may be used in the present invention include without limitation stilbene-bisbenzooxazole derivatives such as 4-(benzooxazole-2-yl)-4'-(5-methylbenzooxazol-2-yl)stilbene and/or 4,4-bis(benzooxazole-2-yl) stilbene.

Examples of release agents that may be used in the present invention include without limitation fluorine-containing silicone oil, metallic salt of stearylic acid, metallic salt of montanic acid, montanic acid ester wax, and/or polyethylene wax. Examples of nucleating agents that may be used in the present invention include without limitation talc and/or clay.

Examples of inorganic additives that may be used in the present invention include without limitation glass fiber, silica, clay, calcium carbonate, calcium sulfate, and/or glass beads.

The flame-retardant thermoplastic resin composition of the present invention may have a coefficient of linear thermal expansion (CTE) of less than about 30, a flame-retardancy of V-0 measured in accordance with UL-94, an Izod impact strength measured according to ASTM D256 of about 5 to about 7 kgfcm/cm, and a flexural modulus measured according to ASTM D790 of about 55,000 to about 75,000 $kgf/cm^2$. Through numerous tests, it has been confirmed that when the thermoplastic resin has properties within the aforementioned ranges, there is critical significance of realizing flame-retardancy and low shrinkage properties and excellent stiffness.

Hereinbelow, there is provided a result of tests conducted to prove the excellency of the flame-retardant thermoplastic resin composition of the present invention.

Specifications of (A) polycarbonate resin, (B) rubber modified aromatic vinyl copolymer, (C) aromatic phosphate ester compound, (D) glass fiber, and (E) carbon fiber used in embodiments exemplifying the invention and comparative examples are as follows.

(A) Polycarbonate Resin

In the embodiments and comparative examples of the present disclosure, a bisphenol-A type polycarbonate having a weight-average molecular weight of 25,000 g/mol is used.

(B) Rubber Modified Aromatic Vinyl Copolymer

The (B) rubber modified aromatic vinyl copolymer resin used in the embodiments and comparative examples of the present disclosure is a resin produced by mixing 40 parts by weight of a styrene graft copolymer resin (b1) and 60 parts by weight of a styrene copolymer resin (b2) shown below.

(b1) Styrene Graft Copolymer Resin (g-ABS)

The styrene graft copolymer resin used in the embodiments and comparative examples of the present disclosure is produced by putting 50 parts by weight of solid butadiene rubber latex into a reactor; adding 36 parts by weight of styrene, 14 parts by weight of acrylonitrile, and 150 parts by weight of deionized water; adding 1.0 parts by weight of potassium oleate, 0.4 parts by weight of cumene hydroperoxide, 0.2 parts by weight of mercaptane chain transfer agent, 0.4 parts by weight of glucose, 0.01 parts by weight of iron sulfate hydrate, and 0.3 parts by weight of pyrophosphate sodium salt, each based on the entirety of solid; completing the reaction after maintaining the mixture at 75° C. for 5 hours to produce graft copolymer resin latex; and then adding 0.4 parts by weight of sulfuric acid to the solid resin to coagulate and produce the styrene graft copolymer resin in powder form.

(b2) Styrene Copolymer Resin (SAN)

The styrene copolymer resin used in the embodiments and comparative examples of the present disclosure is produced by adding 72 parts by weight of styrene, 28 parts by weight of acrylonitrile, 120 parts by weight of deionized water, 0.2 parts by weight of azobisisobutyronitrile, 0.4 parts by weight of tricalcium phosphate, and 0.2 parts by weight of mercaptane chain transfer agent; heating from room temperature up to 80° C. for 90 minutes, then retaining this temperature for 240 minutes to produce styrene copolymer resin containing 25 weight % of acrylonitrile; and then flushing, dehydrating, and drying the same to produce the styrene-acrylonitrile copolymer resin in powder form.

(c) Aromatic Phosphate Ester Compound

In the embodiments and comparative examples of the present invention, diaryl phosphate (PX-200) of the DAIHACHI Co., Ltd. is used.

(D) Glass Fiber

In the embodiments and comparative examples of the present invention, CS321 of KCC Co., Ltd. with a length of 3 mm is used.

(E) Carbon Fiber

In the embodiments and comparative examples of the present invention, PX35CA0250-65 of Zoltek Co., Ltd. is used.

Each component is added according to the amounts shown in table 1 below, and then melted and mixed in a twin-screw melting extruder that is heated to 240-280° C., to prepare a chip state resin composition. The chip attained as aforementioned is dried for more than 5 hours at 80° C., and then a specimen for measurement of flame-retardancy and a specimen for measurement of mechanical properties are prepared using a screw type catapult heated to 240-380° C. The amounts shown in table 1 below are based on 100 parts by weight of polycarbonate resin (A).

TABLE 1

| Components | Embodiments | | | | | Comparative examples | | | | | | | |
|---|---|---|---|---|---|---|---|---|---|---|---|---|---|
|  | 1 | 2 | 3 | 4 | 5 | 1 | 2 | 3 | 4 | 5 | 6 | 7 | 8 |
| A | 100 | 100 | 100 | 100 | 100 | 100 | 100 | 100 | 100 | 100 | 100 | 100 | 100 |
| B | 15 | 15 | 20 | 15 | 15 | — | 50 | 15 | 15 | 15 | 15 | 15 | 15 |
| C | 20 | 20 | 20 | 20 | 20 | 20 | 20 | 5 | 40 | 20 | 20 | 20 | 20 |
| D | 30 | 15 | 30 | 15 | 15 | 30 | 30 | 30 | 30 | — | 60 | 30 | 30 |
| E | 15 | 30 | 15 | 20 | 25 | 15 | 15 | 15 | 15 | 15 | 15 | — | 60 |

The flame-retardancy, impact strength, flexural modulus, and coefficient of linear thermal expansion (CTE) of the specimens formed using the compositions of table 1 above are measured as follows, and the results are set forth in table 2.

Method for Estimating the Properties (1) Flame-retardancy: The flame-retardancy of a 1.5 mm specimen is measured in a UL-94 vertical test method. In table 2 below, ○ means that the UL94V-O flame-retardancy level is satisfied, while X means that the UL94V-O flame-retardancy level is not satisfied.

(2) Impact strength: The impact strength of an ⅛" specimen is measured based on ASTM D256.

(3) Flexural modulus: The flexural modulus of a specimen of 6.4 mm is measured based on ASTM D790.

(4) CTE (coefficient of linear thermal expansion): The CTE of a specimen of 12 mm as a function of temperature is measured using thermomechanical chemical analyzer (TMA) equipment.

TABLE 2

| | Embodiments | | | | | Comparative examples | | | | | | | |
|---|---|---|---|---|---|---|---|---|---|---|---|---|---|
| | 1 | 2 | 3 | 4 | 5 | 1 | 2 | 3 | 4 | 5 | 6 | 7 | 8 |
| Flame-retardancy (UL-94V-0) | ○ | ○ | ○ | ○ | ○ | ○ | X | X | ○ | ○ | X | ○ | ○ |
| Impact strength (kgfcm/cm) | 6 | 5.5 | 6.5 | 5.9 | 5.8 | 3 | 19 | 6.5 | 3 | 3 | 4 | 6 | 3 |

TABLE 2-continued

| | Embodiments | | | | | Comparative examples | | | | | | | |
|---|---|---|---|---|---|---|---|---|---|---|---|---|---|
| | 1 | 2 | 3 | 4 | 5 | 1 | 2 | 3 | 4 | 5 | 6 | 7 | 8 |
| Flexural modulus (kgf/cm$^2$) | 60,000 | 70,000 | 58,000 | 67,000 | 69,000 | 48,500 | 36,000 | 62,000 | 61,000 | 57,500 | 64,000 | 24,000 | 85,000 |
| CTE | 24 | 20 | 24 | 23 | 22 | 28 | 30 | 27 | 31 | 26 | 27 | 37 | 20 |

From table 2, one can see that the thermoplastic resin compositions according to embodiments of 1 to 5 of the present invention exhibit excellent impact strength, flame-retardancy, and low shrinkage, while not deteriorating stiffness.

In contrast, the comparative examples that did not use (B) rubber modified aromatic vinyl copolymer, (D) glass fiber, or (E) carbon fiber, or include (B) rubber modified aromatic vinyl copolymer, (C) aromatic phosphate ester compound, (D) glass fiber, or (E) carbon fiber in amounts outside the ranges of the present invention exhibit significantly deteriorated flame-retardancy, stiffness, impact strength, and low shrinkage properties.

Specifically, comparative examples 1, 4, and 5 that include (B) rubber modified aromatic vinyl copolymer, (C) aromatic phosphate ester compound, and (D) glass fiber in amounts outside the aforementioned ranges of the present invention and comparative example 8 that includes carbon fiber in an amount outside the aforementioned range of the present invention exhibit deteriorated impact strength. Comparative examples 2, 3, and 6 that include (B) aromatic vinyl copolymer, (C) aromatic phosphate ester compound, and (D) glass fiber in amounts outside the aforementioned ranges of the present invention exhibit deteriorated flame-retardancy.

Furthermore, comparative example 7 that did not use (E) carbon fiber exhibits deteriorated low shrinkage properties.

Therefore, from the above tests, it has been proved that there is critical significance in the combination and content ratios of the components of the present invention While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A flame-retardant thermoplastic resin composition comprising:
   polycarbonate resin,
   about 5 to about 30 parts by weight of rubber modified aromatic vinyl copolymer,
   about 10 to about 30 parts by weight of aromatic phosphate ester compound,
   about 1 to about 50 parts by weight of glass fiber, wherein the glass fiber has a diameter of about 5 to about 20 μm and a length of about 1.5 to about 8 mm and wherein in a cross-section of the glass fiber, an average ratio of a major axis to minor axis is about 1:1 to about 2:1, and about 1 to about 50 parts by weight of carbon fiber, wherein the carbon fiber has a diameter of about 3 to about 20 μm and a length of about 1.5 to about 12 mm, each based on about 100 parts by weight of the polycarbonate resin,
   wherein the weight ratio of the glass fiber to the carbon fiber is about 1:0.3 to about 1:2.

2. The composition according to claim 1, wherein the glass fiber has an average ratio of diameter to length of about 1:75 to about 1:1600.

3. The composition according to claim 1, wherein the carbon fiber has an average ratio of diameter to length of about 1:75 to about 1:4000.

4. The composition according to claim 1, wherein the rubber modified aromatic vinyl copolymer comprises about 20 to 100 weight % of aromatic vinyl graft copolymer resin and 0 to about 80 weight % of aromatic vinyl copolymer resin.

5. The composition according to claim 1, wherein the aromatic phosphate ester compound is represented by Chemical Formula 2:

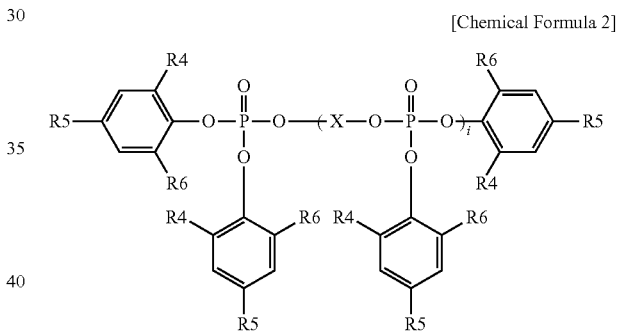

[Chemical Formula 2]

wherein R4, R5, and R6 are the same or different and each are independently hydrogen or C1 to C4 alkyl; each X is independently C6 to C20 aryl or C1 to C10 alkyl-substituted C6 to C20 aryl; and i is 0 to 4.

6. The composition according to claim 1, wherein the glass fiber is not surface treated and/or is surface treated with a glass fiber treatment agent consisting of a lubricant, coupling agent and/or surfactant.

7. The composition according to claim 1, wherein a molded product produced from the composition has a flame-retardancy of V-0 measured in accordance with UL-94, an Izod impact strength measured according to ASTM D256 of about 5 to about 7 kgfcm/cm, and a flexural modulus measured according to ASTM D790 of about 55,000 to about 75,000 kgf/cm$^2$.

8. The composition according to claim 7, wherein a molded product produced from the composition has a coefficient of linear thermal expansion (CTE) of less than about 30 μm/(m·° C.).

9. The composition according to claim 8, wherein a molded product produced from the composition has a coefficient of linear thermal expansion (CTE) of 24 μm/(m·° C.) or less.

10. A molded product produced from the composition according to claim 1.

11. The molded product according claim 10, wherein the molded product has a coefficient of linear thermal expansion (CTE) of less than about 30 μm/(m·° C.).

12. The molded product according claim 10, wherein the molded product has a flame-retardancy of V-0 measured in accordance with UL-94, an Izod impact strength measured according to ASTM D256 of about 5 to about 7 kgfcm/cm, and a flexural modulus measured according to ASTM D790 of about 55,000 to about 75,000 kgf/cm².

* * * * *

UNITED STATES PATENT AND TRADEMARK OFFICE
CERTIFICATE OF CORRECTION

PATENT NO. : 9,556,334 B2  
APPLICATION NO. : 14/706279  
DATED : January 31, 2017  
INVENTOR(S) : Kyoungsik Chin et al.

It is certified that error appears in the above-identified patent and that said Letters Patent is hereby corrected as shown below:

In the Specification

Column 4 delete Chemical Formula I and insert:

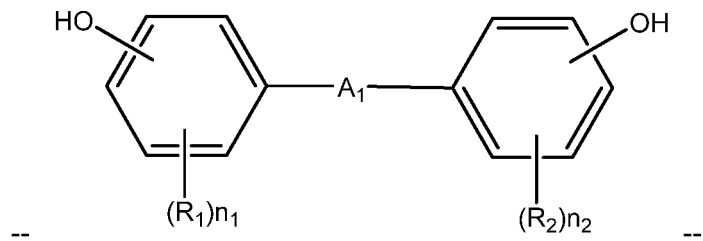

Signed and Sealed this
Twelfth Day of September, 2017

Joseph Matal
*Performing the Functions and Duties of the
Under Secretary of Commerce for Intellectual Property and
Director of the United States Patent and Trademark Office*